United States Patent
Le Maigat et al.

(10) Patent No.: US 11,996,998 B2
(45) Date of Patent: May 28, 2024

(54) METHOD AND SYSTEM FOR MONITORING A CONNECTION BETWEEN TWO TERMINAL EQUIPMENT ITEMS, CORRESPONDING COMPUTER PROGRAM PRODUCT

(71) Applicant: ORANGE, Issy-les-Moulineaux (FR)

(72) Inventors: Pierre Le Maigat, Chatillon (FR); Thierry Houdoin, Chatillon (FR); Emile Stephan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/279,838

(22) PCT Filed: Sep. 25, 2019

(86) PCT No.: PCT/FR2019/052252
§ 371 (c)(1),
(2) Date: Mar. 25, 2021

(87) PCT Pub. No.: WO2020/065212
PCT Pub. Date: Apr. 2, 2020

(65) Prior Publication Data
US 2021/0399965 A1 Dec. 23, 2021

(30) Foreign Application Priority Data

Sep. 28, 2018 (FR) ...................................... 1858990

(51) Int. Cl.
*H04L 43/0864* (2022.01)
*H04L 43/0811* (2022.01)

(52) U.S. Cl.
CPC ...... *H04L 43/0864* (2013.01); *H04L 43/0811* (2013.01)

(58) Field of Classification Search
CPC . H04L 43/0864; H04L 43/0811; H04L 41/08; H04L 41/12; H04L 43/20
See application file for complete search history.

(56) References Cited

U.S. PATENT DOCUMENTS 6,768,787 B1 * 7/2004 Pester, III ........... H04M 3/2254
379/22
10,516,583 B1 * 12/2019 Wakhare ............. H04L 41/5019
(Continued)

FOREIGN PATENT DOCUMENTS

WO   WO-2021239841 A1 * 12/2021

OTHER PUBLICATIONS

International Search Report dated Jan. 7, 2020 for corresponding International Application No. PCT/FR2019/052252, dated Sep. 25, 2019.

(Continued)

*Primary Examiner* — Jerry B Dennison
(74) *Attorney, Agent, or Firm* — David D. Brush; Westman, Champlin & Koehler, P.A.

(57) ABSTRACT

A method is proposed for monitoring a connection between end devices via a communications network. A set of modes having at least two monitoring modes and a ranking order associated with the set of modes, are agreed upon between the end devices and a network device present on a path between the end devices. The method includes an activation of the set of modes, corresponding to an activation of the first mode according to the ranking order; then an activation, according to the ranking order, of each other mode of the set of modes. Each monitoring mode includes at least one mechanism implemented by at least one of the end devices and enabling the network device to perform at least one function of monitoring the connection.

17 Claims, 5 Drawing Sheets

(56) References Cited

U.S. PATENT DOCUMENTS

| | | | | |
|---|---|---|---|---|
| 2006/0234639 | A1* | 10/2006 | Kushwaha | H04W 24/00 455/67.11 |
| 2007/0115832 | A1* | 5/2007 | Ramalho | H04L 43/0829 370/352 |
| 2010/0034098 | A1* | 2/2010 | Wang | H04L 43/00 370/242 |
| 2010/0241907 | A1* | 9/2010 | Nakamura | G06F 11/0748 709/224 |
| 2014/0036688 | A1* | 2/2014 | Stassinopoulos | H04L 41/042 370/241 |
| 2016/0105353 | A1* | 4/2016 | Cociglio | H04L 43/0829 370/252 |
| 2019/0116535 | A1* | 4/2019 | Szilagyi | H04W 28/24 |
| 2019/0253774 | A1* | 8/2019 | Grammel | H04Q 11/0062 |
| 2021/0218687 | A1* | 7/2021 | Tinnakornsrisuphap | H04L 47/12 |
| 2021/0399965 | A1* | 12/2021 | Le Maigat | H04L 43/0829 |

OTHER PUBLICATIONS

Written Opinion of the International Searching Authority dated Jan. 7, 2020 for corresponding International Application No. PCT/FR2019/052252, filed Sep. 25, 2019.

Trammell B et al. "Adding Explicit Passive Measurability of Two-Way Latency to the QUIC Transport Protocol; draft-trammell-quic-spin-03.txt" Adding Explicit Passive Measurability of Two-Way Latency to the QUIC Transport Protocol; draft-trammell-quic-spin-03.txt; Internet-Draft: QUIC, Internet Engineering Task Force, IETF; StandardWorkingDraft, Internet Spcienty (ISOC) 4, Rue Des Falaises C, No. 3, May 14, 2018 (May 14, 2018), pp. 1-24 XP015126398.

English translation of the Written Opinion of the International Searching Authority dated Jan. 13, 2020 for corresponding International Application No. PCT/FR2019/052252, filed Sep. 25, 2019.

Ian Swett, "QUIC passive RTT measurement", IETF 99, slides, Jul. 20, 2017.

Fioccola, G. et al., "Alternate marking method for passive and hybrid performance monitoring", Network Working Group, https://tools.ietf.org/html/draft-ietf-ippm-alt-mark-05, Jun. 26, 2017.

Fioccola, G. et al., "Alternate Marking method for passive performance monitoring", draft-ietf-ippm-alt-mark-01, IETF 96, Jul. 2016.

Brian Trammell, "Enabling Internet Measurement with the QUIC Spin Bit", IETF working paper, https://www.ietfjournal.org/enabling-internet-measurement-with-the-quic-spin-bit/, May 15, 2018.

"ECN support in QUIC", Ericsson AB, dated Jan. 22, 2018.

Trammell, B. et al., "The QUIC Latency Spin Bit", draft-ietf-quic-spin-exp-00, Apr. 26, 2018.

Trammell, B. et al., "Adding Explicit Passive Measurability of Two-Way Latency to the QUIC Transport Protocol", draft-trammell-quic-spin-03, May 14, 2018.

Friedl, S. et al., "Transport Layer Security (TLS) Application-Layer Protocol Negotiation Extension", Request for Comments: 7301, ISSN: 2070-1721, Jul. 2014.

Piet De Vaere, "Adding Passive Measurability to QUIC", Swiss Federal Institute of Technology Zurich, Master Thesis MA-2017-16, Sep. 2017 to Apr. 2018.

Aboba, B. et al., "QUIC Multiplexing", draft-aboba-avtcore-quic-multiplexing-01.txt, Oct. 29, 2017.

* cited by examiner

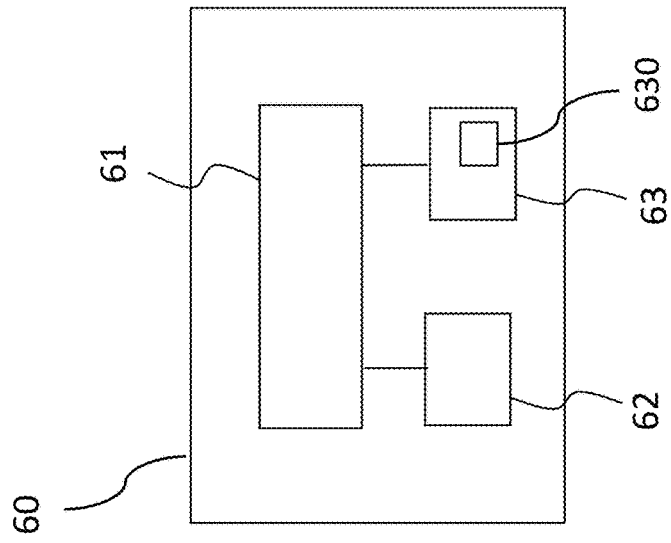
Figure 6
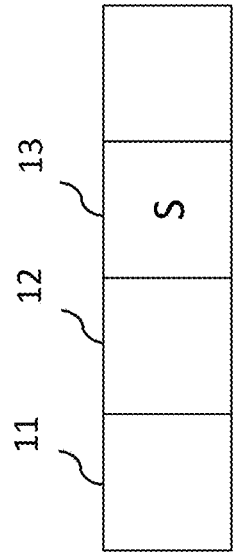
Figure 1
Figure 5

METHOD AND SYSTEM FOR MONITORING A CONNECTION BETWEEN TWO TERMINAL EQUIPMENT ITEMS, CORRESPONDING COMPUTER PROGRAM PRODUCT

CROSS-REFERENCE TO RELATED APPLICATIONS

This Application is a Section 371 National Stage Application of International Application No. PCT/FR2019/052252, filed Sep. 25, 2019, the content of which is incorporated herein by reference in its entirety, and published as WO 2020/065212 on Apr. 2, 2020, not in English.

TECHNICAL FIELD

The field of the invention is that of communications networks.

More specifically, the invention relates to a method for monitoring a connection between two end devices (also referred to as "endpoints") via a communications network.

In the present description, the term "monitoring of a connection" is understood to mean any type of operation used to measure performance and, if necessary, to carry out troubleshooting on this connection.

The invention can be applied especially but not exclusively in a context where the QUIC (Quick UDP Internet Connections) transport protocol is implemented. This is a transport layer protocol of the OSI (Open System Interconnection) model.

TECHNOLOGICAL BACKGROUND

We focus more particular here below in this document on describing the problems and issues existing in the context where the QUIC transport protocol is implemented. The invention is of course not limited to this particular context of application but is of interest for any network-monitoring technique (as understood here above) that has to face proximate or similar problems and issues.

The QUIC protocol emulates the TCP (Transmission Control Protocol) and TLS (Transport Layer Security) protocols over the UDP (User Datagram Protocol). It therefore encrypts application data in the same way as the HTTPS (HyperText Transfer Protocol Secure), TLS and DTLS (Datagram Transport Layer Security) protocols. It differs from the TCP protocol in two aspects in particular:

- unlike the TCP protocol, the QUIC protocol encrypts the data in the header of the transport layer. As a result, the network devices (also called network middleboxes) can no longer measure the RTT or half-RTT times through the observation of the packet acknowledgements (the RTT is the round-trip time between two end devices); and
- the QUIC protocol ensures data transport by retransmitting the data in packets that are monotonically numbered (data retransmitted with the current packet number) and are indistinguishable from the non-retransmitted packets. The network devices therefore can no longer identify and count the retransmission of the non-received data or the packet losses.

In order to overcome these drawbacks for network devices, the QUIC protocol specification reserves 1 bit, named "S" and called a "spin bit", in the header of the QUIC packets. FIG. 1A generically illustrates the header of a QUIC packet comprising especially the first and second encrypted fields 11, 12 followed by the "spin bit" field that is unencrypted and can therefore be used as a metrology bit. It is dedicated to experimenting on techniques of monitoring by the network devices on the path of a QUIC connection. It is a first level of co-operation between the network devices and the end devices.

The detailed specification of the use of the spin bit is being discussed. A design team has been created within the "WG QUIC" working group of the IETF (Internet Engineering Task Force) to deal with the subject. Two points seem to be settled:

- the spin bit will be used to mark the packets in order to measure the RTT or half-RTT. It can be used for Active Queue Management (AQM) and to enable network operators to make a minimum number of observations;
- the spin bit mechanism will be activated optionally when needed, at the discretion of the end devices.

As described in the IETF working paper "Enabling Internet Measurement with the QUIC Spin Bit" dated May 15, 2018 (available at https://www.ietfjournal.org/enabling-internet-measurement-with-the-quic-spin-bit/), and illustrated in FIGS. 2A and 2B, the value of the spin bit is modified once per end-to-end round-trip time between the client 21 and the server 23. Each spin bit transition from 0 to 1 or from 1 to 0 corresponds to a leading edge or a trailing edge.

FIG. 2A is a schematic depiction of complete RTT measurements (upstream and downstream) by a network device (observer) 22 on the path established for the transfer of data between the client 21 and the server 23. The network device 22 measures the duration (on a local clock) between these edges to generate an estimate of RTT. It can do so by observing the flow in the client-to-server direction (this is then called a full upstream RTT measurement). It can also do so by observing the flow in the server-to-client direction (this is then called a full downstream RTT measurement). These RTT estimates can then be aggregated and analyzed to identify critical latency points in a network.

FIG. 2B is a schematic representation of half-RTT measurements (upstream and downstream) by a network device (observer) 22 on the path between the client 21 and the server 23). The network device 22 measures the duration (on its local clock) between two identical values of the spin bit, each in a distinct direction). It can do this by observing the flow first in the client-to-server direction and then in the server-to-client direction (this is then called the upstream half-RTT measurement). It can also do this by observing the flow first in the server-to-client direction and then in the client-to-server direction (this is then called the downstream half-RTT measurement).

The above-mentioned working paper also describes a variant in which the "spin bit" mechanism is coupled with a VEC (Valid Edge Counter) mechanism using two additional bits in order to provide a higher resolution of the latency problems in a network.

As currently envisaged, the "spin bit" mechanism has two major drawbacks.

A first drawback is that the "spin bit" mechanism is activated optionally, at the discretion of the end devices. The time values (especially RTT) will be therefore rarely observable or measurable. The spin bit mechanism therefore enables only a low level of cooperation between the end devices and the network device (middlebox), since the network device is passive (it cannot decide on the activation of the mechanism or send any indication to the end devices).

A second drawback is that the spin bit mechanism (whether used alone or in combination with the VEC mechanism) is intended only to enable the measurement of times (in the sense of time periods) (RTT or half-RTT especially). It allows no other type of measurements and these measurements thus require other mechanisms. For example, the measurement of packet loss requires the use of another mechanism distinct from the spin bit mechanism (for example the alternate marking mechanism also called the alternate marking (coloring) technique described especially in the IETF working paper entitled "Alternate marking method for passive and hybrid performance monitoring" dated Dec. 28, 2017 (available at the URL https://tools.ietf.org/html/draft-ietf-ippm-alt-mark-05).

At present, there is no simple solution enabling a network device (middlebox) to perform several monitoring functions, a fortiori (let alone do so) while being active in cooperation with the end devices.

The drawbacks defined here above for the QUIC protocol spin bit mechanism can be extended to any context in which the protocol (for example one of the layers 2 (link layer), 3 (network layer), 4 (transport layer) or 7 (application layer) of the OSI module) stipulates the encryption of control data except for one or more bits readable by the network devices (middleboxes) to perform one or more monitoring functions.

SUMMARY

One particular embodiment of the invention proposes a method for monitoring a connection between end devices via a communications network. A set of modes, comprising at least two monitoring modes and a ranking order associated with said set of modes are agreed upon between the end devices and a network device present on a path between the end devices. The method comprises: an activation of said set of modes, corresponding to an activation of the first mode according to said ranking order; then an activation, according to said ranking order, of each other mode of said set of modes. Each monitoring mode comprises at least one mechanism implemented by at least one of the end devices and enabling said network device to perform at least one function of monitoring said connection.

The general principle of the invention consists therefore in using a set of modes (comprising at least two monitoring modes) and an associated ranking order, that are known to both the end devices (or endpoints) and the network device. The activation of this set of modes and the control of its life cycle (i.e., the passage (also referred to as "switching") from one of the modes to the other according to the associated ranking order) makes it possible to obtain a sequence of different modes (including the at least two monitoring modes).

Thus it is easy, on the network side, to carry out several types of monitoring measurements (for example measurements of times, packet losses, quality of service (QoS), quality of experience (QoE), etc.).

This also augments the level of cooperation between the end devices and the network device since the network device can be active. It can activate the set of modes and/or the passage from one mode of this set to the other.

In addition, this cooperation can easily be modified (it is enough to change the set of modes and/or the associated ranking order). This cooperation can also easily be automated or can integrate successive loops (each loop corresponding to a passage, according to the ranking order, by the different modes).

The passage, according to the ranking order, by the different modes is expressed by the activation of several mechanisms successively (or even simultaneously in certain cases if they are included in the same monitoring mode).

According to one particular characteristic, at least one of said monitoring modes comprises at least two mechanisms implemented simultaneously by at least one of the end devices, each enabling said network device to perform at least one distinct monitoring function.

Thus, one or more monitoring modes of the set can be multi-mechanisms in combining mechanisms that can be carried out simultaneously.

According to one particular characteristic, said at least one monitoring function belongs to the group comprising:
- a measurement of at least one time period;
- a measurement of packet loss;
- a measurement of quality of service;
- a measurement of quality of experience; and
- a sending of at least one piece of information to the end devices.

It is thus possible to obtain a wide variety in the monitoring functions performed on the network side. This list is not exhaustive.

According to one particular characteristic, said at least one mechanism belongs to the group comprising:
- a mechanism for repeating or inverting a particular bit in a packet header in which a first end device sets the particular bit to 1, or 0 respectively, and then a second end device repeats the particular bit to 1, or 0 respectively, and then the first end device inverts the value of the particular bit;
- a combination of a given mechanism belonging to the group and an additional mechanism for inserting a piece of contextual information of applicability of said given mechanism;
- a mechanism for repeating or inverting a particular bit in a packet header, in which an end device repetitively sets the particular bit to 1 or 0 respectively;
- a mechanism for disabling the encryption of the packet numbering;
- should said connection be a multipath connection, a mechanism for adding, in said connection, another path between the end devices that does not encrypt the packet numbering;
- should said connection be a multipath connection, a mechanism for adding, in said connection, another path between the end devices, another set of modes and another associated ranking order being agreed upon, for said other path, between the end devices and another network device present on said other path;
- a mechanism using at least one bit in a packet header to send at least one piece of information on network context;
- a monitoring mechanism at the transport layer;
- a monitoring mechanism at the application layer;
- a mechanism for repeating and inverting a particular bit in a packet header, wherein a first end device sets the particular bit to 1, or to 0 respectively, and then a second end device repeats the particular bit to 1, or to 0 respectively, and then the first end device repeats the particular bit to 1, or to 0 respectively, and then keeps silent for at least one round-trip time.

It is possible to combine (i.e., to successively or simultaneously execute) mechanisms (using or not using the spin bit). This list is not exhaustive.

According to one particular characteristic, at least one of said monitoring modes comprises at least one additional function implemented by at least one of the end devices.

Thus, in addition to the above-mentioned mechanisms, one or more monitoring modes can include one or more complementary functions. This improves the completeness of the monitoring operations performed when the set of monitoring modes is activated.

According to one particular characteristic, said at least one complementary function belongs to the group comprising:

passage into a mode where one of the end devices acting as receiver does not ask for retransmission of non-received data;

passage into a mode where one of the end devices acting as sender does not transmit data pending in a sending buffer and passes to the following data;

passage to a mode where one of the end devices, acting as sender, does not transmit pending application data and passes to the following application data;

passage to a mode where one of the end devices acting as sender does not transmit data during a roundtrip time; and sending by one of the end devices, acting as a sender, of an indication of an increase in allocated network resources.

This list is not exhaustive.

According to one particular characteristic, before being agreed upon between the end devices and the network device, said set of modes and said associated ranking order are proposed by a management device for managing said network when the end devices are attached to said communications network.

Thus, various solutions can be envisaged to propose said set of modes and said associated ranking order.

According to one particular characteristic, after having been proposed, said set of modes and/or said associated ranking order is (are) modified by at least one device among the device for managing said network, at least one of the end devices and the network device.

Thus, several entities (among the two end devices and the network device) can participate in the final selection of said set of modes and said associated ranking order.

According to one particular characteristic, said set of modes and said associated ranking order are agreed upon between the end devices and the network device during the connection between the end devices, then recorded in a session ticket. Said set of modes and said associated ranking order that are agreed upon are reusable when a session is resumed or at a new session.

The proposed solution is therefore compatible with the session tickets.

According to one particular characteristic, the activation of said set of modes is carried out by the network device or by one of the end devices if at least one activation condition is verified.

Thus, various solutions can be envisaged to activate said set of modes.

According to one particular characteristic, the activation of said set of modes by the network device comprises a modification of the value of at least one bit in a packet header, said modification being detectable by one of the end devices.

In this way, should the activation of the set of modes be performed by the network device, the invention makes ingenious use of an inversion of the value of at least one bit to perform this activation (for example, the network device inverts the value of the spin bit, which is an action not stipulated in the current specification of the QUIC transport protocol).

According to one particular characteristic, said at least one condition of activation relates to the data exchanged and belongs to the group comprising:

a quantity of data not received by one of the end devices acting as a receiver is above a first predetermined threshold;

a quantity of data retransmitted by one of the end devices acting as a sender is above a second predetermined threshold;

a piece of information on pre-congestion is detected by one of the end devices; and a quantity of control data detected as being corrupted by one of the end devices is above a third threshold.

In this way, should the activation of the set of modes be performed by one of the end devices, there is a wide variety of possible conditions of activation.

According to one particular characteristic, the activation of each other mode of said set is carried out by the network device or one of the end devices.

Thus, various solutions can be envisaged to activate each other mode of said set of modes.

According to one particular characteristic, the activation of each other mode of said set by the network device includes a modification of the value of at least one bit in a packet header, said modification being detectable by one of the end devices.

In this way, should the activation of each other mode be done by the network device, the invention ingeniously uses an inversion of the value of at least one bit to carry out this activation (the network device inverts for example the value of the spin bit, which is an action not stipulated in the current specification of the QUIC transport protocol).

According to one particular characteristic, said ranking order belongs to the group comprising a random order, a predetermined and cyclical order, and a predetermined and non-cyclical order.

Thus, it is possible to achieve wide variety in the ranking order, and therefore in the execution of the modes of monitoring. This list is not exhaustive.

According to one particular characteristic, said connection is a multipath connection and said path results from an addition of a path into said multipath connection, said addition of a path having been triggered by an activation of another mode that is unique or forms part of another set of modes agreed upon between the end devices and another network device present on another path between the end devices. Thus the concept of a set of monitoring modes, as defined further above in the present solution, can be applied to a path added in a multipath connection. The monitoring mode that has triggered this addition of a path is either a unique mode (i.e., one that does not form part of another set of monitoring modes), or a mode forming part of another set of monitoring modes.

Another embodiment of the invention proposes a computer program product comprising program code instructions for the implementing of the above-mentioned method (in any one of its different embodiments), when said program is executed by a processor.

Another embodiment of the invention proposes a computer-readable and non-transient storage medium, storing a computer program comprising a set of instructions executable by a processor to implement the above-mentioned method (in any one of its different embodiments).

Another embodiment of the invention proposes a system for monitoring a connection between end devices via a communications network wherein a set of modes comprising at least two monitoring modes and a ranking order associated with said set of modes are agreed upon between the end devices and a network device present on a path between the end devices, each monitoring mode comprising at least one mechanism implemented by at least one of the end devices and enabling said network device to perform at least one monitoring function for monitoring said connection. The system comprises means of activation of said set of modes corresponding to an activation of the first mode according to said ranking order and means of activation, according to said ranking order, of each other mode of said set of modes.

According to one particular characteristic, said network device or one of the end devices comprises a reprogrammable computation machine and/or a dedicated computation machine configured to implement said means for activating said set of modes and said means for activating each other mode of said set of modes.

LIST OF FIGURES

Other features and advantages of the invention shall appear from the following description, given by way of an indicative and non-exhaustive example; and from the appended drawings, of which:

FIG. 1, already described in relation to the prior art, generically illustrates the header of a QUIC packet;

Figure 2A:
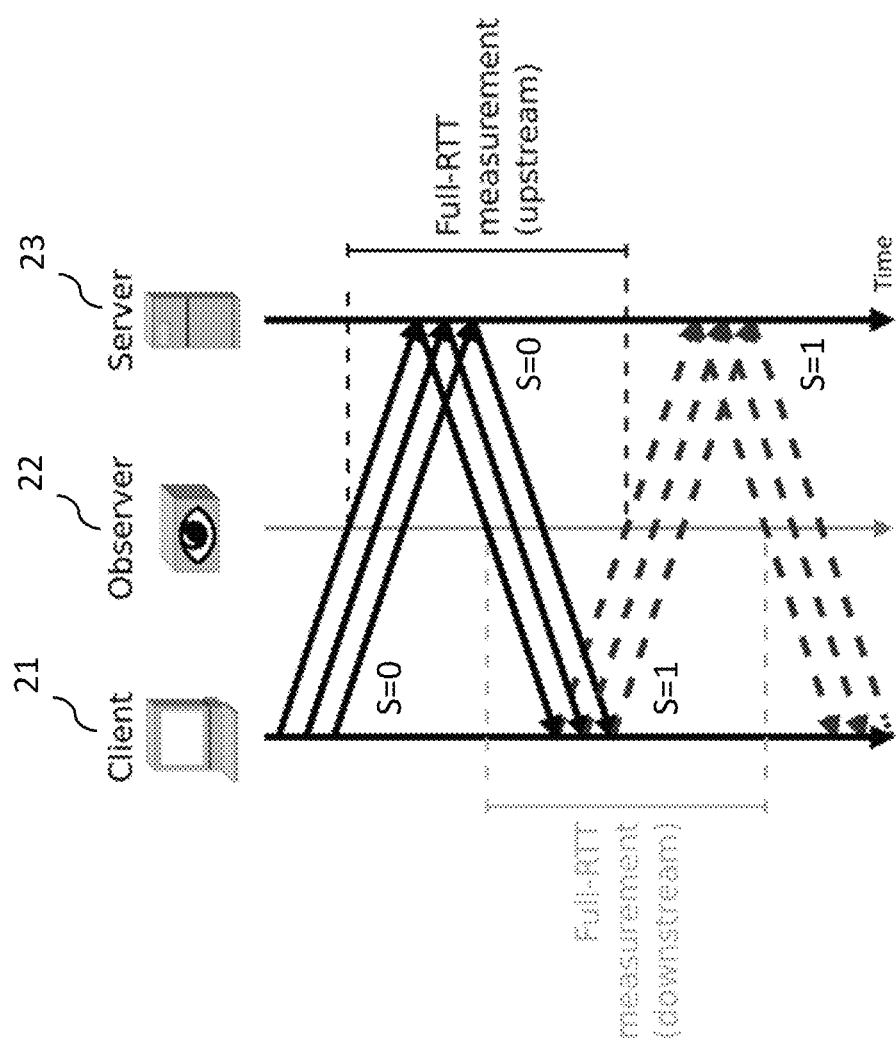
FIG. 2A is a schematic representation of complete (upstream and downstream) RTT measurements by a network device on the path between the client and the server.
Figure 2B:
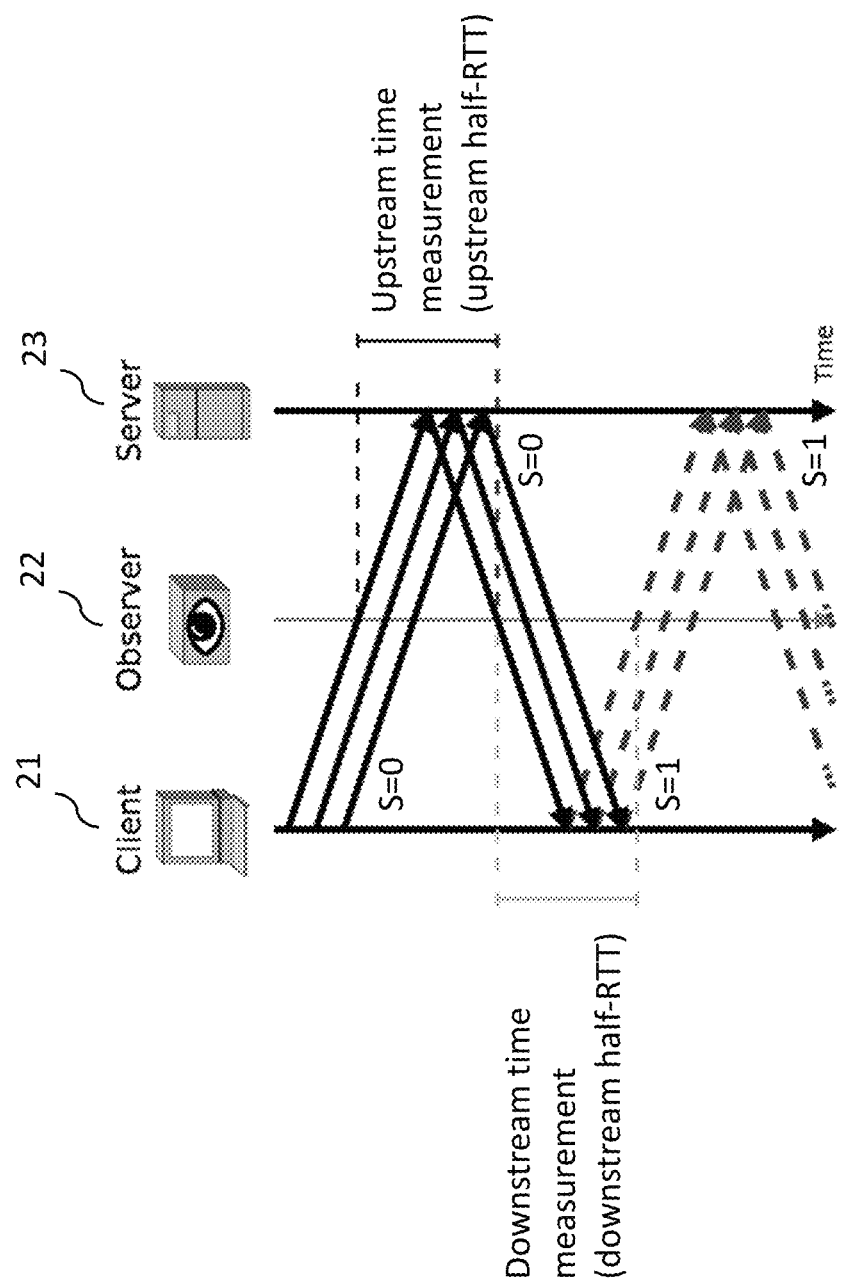
FIG. 2B is a schematic representation of half-RTT measurements (upstream and downstream) by a network device on the path between the client and the server.
Figure 3:
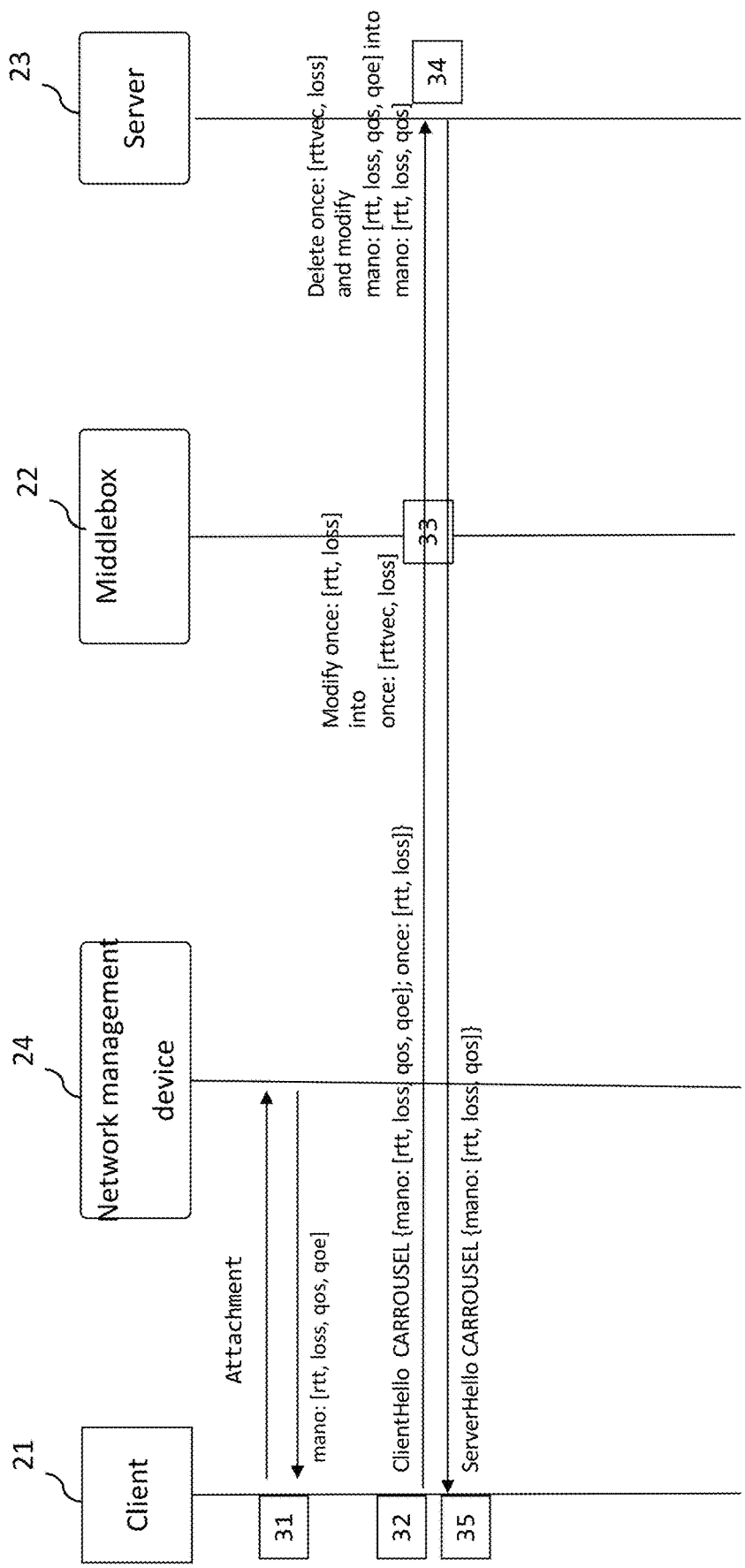
Figure 4:
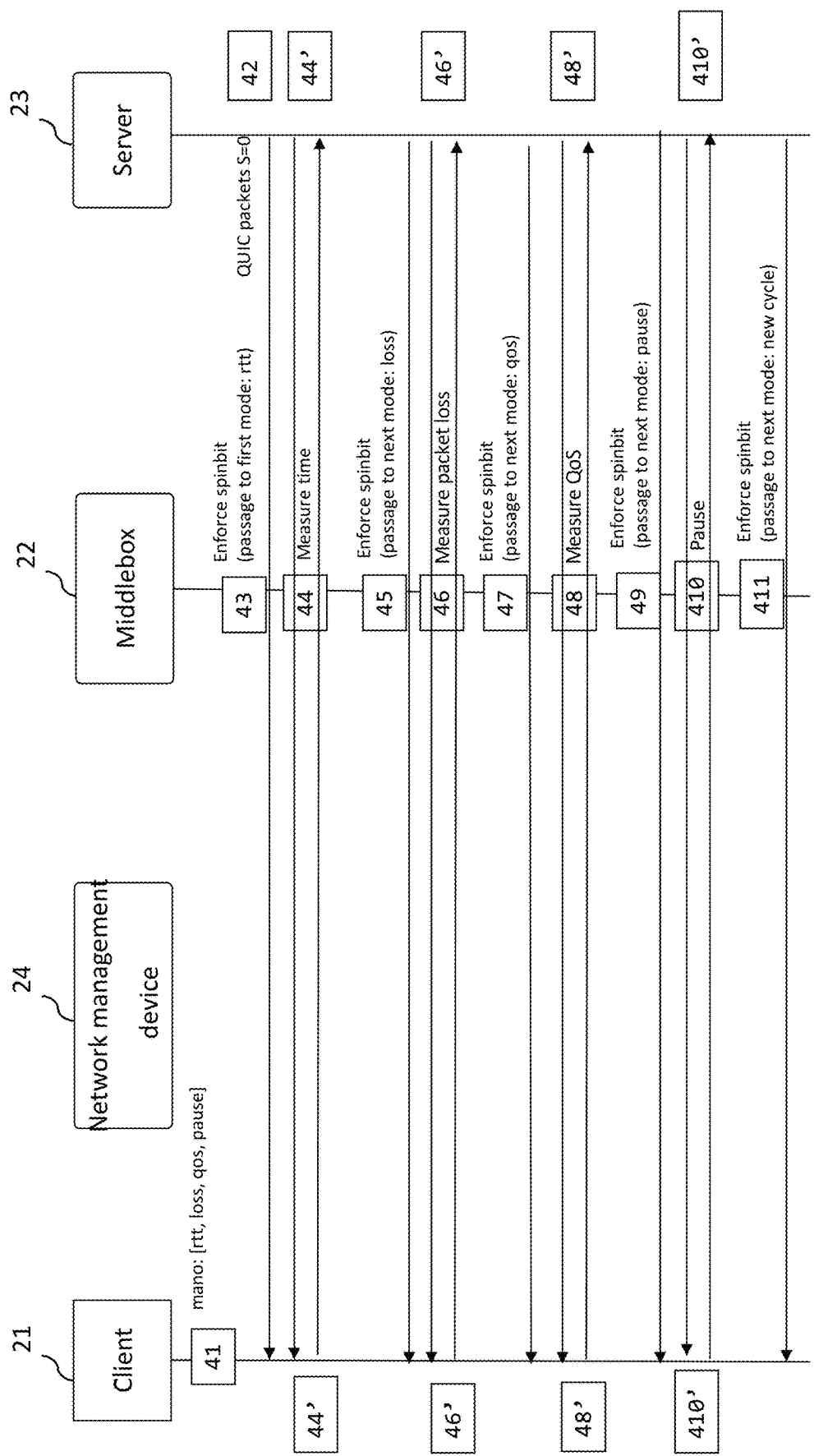

FIG. 3 presents an event diagram illustrating an example of the building and sharing of a set of modes and an associated ranking order when setting up a QUIC connection;

FIG. 4 is an event diagram illustrating an example of use of a set of modes and an associated ranking order during the use of a QUIC connection;

FIG. 5 is a flowchart of a particular embodiment of the method according to the invention; and FIG. 6 presents the structure of a device corresponding to each of the two end devices and to the middlebox (network device) according to one particular embodiment of the invention.

DETAILED DESCRIPTION

In all the figures of the present document, the identical elements and steps are designated by a same numerical reference.

General Principle

FIG. 5 presents a flowchart of one particular embodiment of the method according to the invention for monitoring a connection between end devices via a communications network.

Here below in the description, we consider by way of an example the case of a "unicast" configuration (connection between a first end device and a second end device). The invention is not limited to this implementation and can be applied equally well to other configurations, especially "multicast" configurations (connections with a plurality of end devices).

Three successive steps referenced 51 to 53 can be distinguished.

At the step 51 (discovery), a set of modes (comprising at least two monitoring modes) and an associated ranking order are agreed upon between the two end devices and a middlebox (network device) present on a path between the two end devices.

At the step 52 (activation of the set of modes), the above-mentioned set of modes is activated. This comprises an activation of the first mode according to the ranking order.

At the step 53 (passage or switching from one mode to another), each other mode of the set of modes is activated according to the ranking order. Thus, if there are several other modes (after the first one) they are each activated in turn.

These steps and the elements used therein are now described in detail. In one particular implementation, each monitoring mode comprises at least one mechanism implemented by at least one of the two end devices and enabling the middlebox and/or at least one other middlebox to perform at least one connection monitoring function.

In one particular implementation, the set of modes comprises a pause mode (unlike a monitoring mode, no mechanism is implemented by the end devices to enable the middlebox to perform at least one monitoring function). As described further below with reference to FIG. 4, the pause mode is for example the last mode (in the ranking order) of the set of modes (for example: "{mano: [rrt, loss, qos, pause]}") and therefore makes it possible, in the case of a cyclical ranking order with return to the first mode, to wait before triggering a new cycle.

Thus, through the different modes of monitoring of the set, different monitoring functions can be carried out, especially:

- a measurement of at least one time period, on a two-way flow (see for example here below the presentation of the mechanisms with the identifiers "rtt" and "rttvec") or one-way flow (see for example here below the presentation of the mechanism with the identifier "uni");
- a measurement of packet loss (see for example here below the presentation of the mechanisms with the identifiers "mark", "loss" and "multipath_1");
- a measurement of quality of service (measurement proper to a part of a service; for example: audio, video) (see for example here below the presentation of the mechanism with the identifier "qos");
- a measurement of quality of experience (measurement proper to a client's perception of an application) (see for example here below the presentation of a mechanism with the identifier "qoe");
- the sending of at least one indication to the end devices (see for example here below the presentation of the mechanism with the identifier "ECN_L4");
- etc.

Purely for the sake of simplicity, it is assumed here below in the description that each monitoring mode comprises only one mechanism implemented by at least one of the two end devices and enabling the middlebox and/or at least one other middlebox to perform a single monitoring function. The present invention is of course not limited to this particular implementation and also relates to the case where at least one of the monitoring modes comprises at least two mechanisms implemented simultaneously, each enabling the middlebox and/or the other middlebox to perform at least one distinct monitoring function. For example, one and the same mode can include the mechanisms (described here below) with the identifiers "rtt" and "multipath_1" to simultaneously perform a measurement of RTT and a measurement of packet loss.

Discovery

In one particular implementation, before agreement between the end devices and the middlebox, the set of modes and the associated ranking order are proposed by a device for managing the network or 'network management device' (when one of the two end devices is attached to the communications network), or one of the two end devices acting as a client role or again one of the two end devices acting as a server. After having been proposed, the set of modes and/or the associated ranking order is (or are) if necessary modified by the network management device and/or at least one of the two end devices and/or the middleboxes.

In the case of a proposal by a device for managing the network, the set of modes and/or the associated ranking order are for example proposed by an AAA ("Authentication, Authorization, Accounting/Auditing") function executed or relayed by the network management device during a client access control. In other words, the client or the server can provide information on the supported modes, using information received from the network management device.

In the case of a proposal by the client, the set of modes and/or the associated ranking order are for example negotiated when setting up the QUIC (or TLS or TCPCrypt) function in a new TLS extension (described further below and called CARROUSEL) present in the handshake setting up the transport security (handshake, TLS, ClientHello, QUIC CHO, etc.) when creating the connection, or even when resuming the session. Information on the new extension is provided by the client or the server or even by selection of a mode from a set of modes supported by one or the other. In this case, a network management device comes to know the set of modes and can remove the mode or modes that do not suit it. It can also add modes or propose them in a different order, or even remove certain modes. The client will detect the fact that the set of modes has been modified and can decide whether or not to accept the modifications made.

In the case of a proposal by the server, the set of modes and/or the associated ranking order are for example proposed in an ALT-SVC field of an HTTP1 or HTTP2 header. This prompts the client to reconnect to another server (or the same one) supporting the mode or modes being sought. One connection is then added in the client-to-server direction, supporting the set of modes selected (same quintuplet except client port) and offering for example greater possibilities for an application troubleshooting operation (see for example "quico_dmz" or "quico_taps").

In another particular implementation, the set of monitoring modes and the associated ranking order are agreed upon between the two end devices and the middlebox during the connection between two end devices (see here below the description of FIG. 3, for example), then recorded in a session ticket. Here below, the set of modes and the associated ranking order agreed upon are reused when the session is resumed (or when a new session is started). For example, when a QUIC session (~0-RTT) is resumed, a TLS session ticket is used, also containing an indication of modes supported by the QUIC connection when it is created.

Activating the Set of Modes and Passing (or Switching) from One Mode to Another (Control of the Life Cycle).

In a first embodiment, the initial activation of the set of modes and then the activation of each change of mode (i.e. each passage from one node to another according to the ranking order) are carried out by the middlebox when it deems it necessary.

In one particular implementation, each activation is carried out by the middlebox in modifying the value of at least one bit in a packet header, this modification being detectable by one of the end devices.

In one particular implementation, the above-mentioned modification is an enforced inversion of a value of the spin bit defined in this specification of the QUIC transport protocol. More generally, the middlebox performs an inversion of the value of at least one bit in a packet header, the integrity of this value being protected by the end devices so that the inversion can be detected by one of the end devices.

For example, the inversion of a 0 is a request for initial activation and the inversion of a 1 is a request for passage to the next mode. The principle is the following: each enforced inversion of a value of the spin bit by the middlebox acts on a protection (for example an HMAC type message authentication code) enjoyed by (i.e. from which benefits) the message whose header contains the spin bit. The authentication code on the message received by the end device is therefore false, but this authentication code becomes true (and the protection is kept) if the end device inverts the value of the spin bit and redoes the computation. Thus, the end device detects that there is an enforced inversion of a spin bit value and deduces therefrom that this means an activation (either an initial activation or activation of the passage from one mode to another depending on whether the inversion is a 0 or a 1) by the middlebox.

In a second embodiment, the initial activation of the set of modes and then the activation of each change of mode are done by one of the two end devices, if at least one activation condition is verified. Examples of activation conditions:
   a quantity of data not received by one of the two end devices acting as a receiver is above a predetermined first threshold;
   a quantity of data retransmitted by one of the two end devices acting as a sender is above a predetermined second threshold;
   a piece of information on pre-congestion is detected by one of the two end devices (for example upon reception of the ECN bit indicating a pre-congestion on the path or upon reception of the RE-ECN bit indicating a series of pre-congestions on the path;
   when an RTCP XR message indicates a maximum loss episode length that is substantial (when the QUIC protocol is multiplexed with other transport protocols (see "rfc7983" and https://tools.ietf.org/html/draft-aboba-avtcore-quic-multiplexing-01 on UDP port 443));
   a quantity of control data detected as being corrupted by one of the two end devices is above a third threshold;
   etc.

Mechanisms

Some examples are now presented of mechanisms, implemented by at least one of the two end devices and enabling the middlebox and/or at least one other middlebox to perform a monitoring function:
   mechanism with the identifier "rtt": mechanism for repeating and inverting a particular bit in a packet header in which a first end device places the particular bit to 1, 0 respectively, and then a second end device repeats the particular bit to 1, 0 respectively, and then the first end device inverts the value of the particular bit (and so on and so forth). This is for example the "spin bit" mechanism defined in the specification of the QUIC transport protocol (current behavior of the spin bit as defined for example in https://tools.ietf.org/wg/quic/draft-ietf-quic-spin-exp/);
   mechanism with the identifier "rttvec": combination of a given mechanism of the present list and a mechanism for the additional insertion of a contextual indication of applicability of this given mechanism. It is for example a combination of the "spin bit" and "VEC" mechanisms defined in the QUIC transport protocol specification (see for example https://tools.ietf.org/html/draft-trammell-quic-spin-03#section-4);

mechanism with the identifier "mark": mechanism for repeating and inverting a particular bit in a packet header in which an end device repetitively sets the particular bit to 1, 0 respectively. This is for example the alternate marking mechanism called "alternate marking (coloring) technique" (see for example https://tools.ietf.org/html/draft-ietf-ippm-alt-mark-05);

mechanism with the identifier "loss": mechanism for disabling the encryption of the field numbering ("Packet Number" field) in the QUIC packet header on the path;

mechanism with the identifier "multipath_1": in the case of a multipath connection, creation of another path between the end devices, on which there is no encryption of the packet numbering ("Packet Number" field) (for example in the QUIC packet header);

mechanism with the identifier "multipath_2": in the case of a multipath connection, creation of another path between the end devices, on which the end devices and another middlebox (present on this other path) use another set of modes associated with another ranking order;

mechanism with an identifier "ECN_L4": mechanism using at least one bit in a packet header (for example in the QUIC packet header) to send at least one network context indication. For example, once the ECN_L4 mode is activated, the spin bit S is used by the transport layer (the indication is therefore not positioned at the IP layer level like the ECN or L4S) to indicate penalizing or encouraging of network contexts of congestion, jitter, loss, S/N, flowrate, etc. The indication is for example carried by the two VEC bits (using the same activation method) or if necessary via another framing;

mechanism with an identifier "QoS": monitoring mechanism at the transport layer (quality of service mechanism, QoS). This is for example the sending by the client of a request for adding a TCP path in a QUIC multipath connection with a PATH_CHALLENGE message in a TCP ENO connection so that the network can observe the transport layer of a part of the QUIC multipath connection. Another possibility is that of adding a path of another protocol (e.g. RTP) on a same port according to rfc7983 and https://tools.ietf.org/html/draft-aboba-avtcore-quic-multiplexing-01;

mechanism with the identifier "QoE": monitoring mechanism on the application layer (quality of experience or QoE mechanism). This is for example the sending by the client of a request for adding a path in a QUIC multipath connection (for example with a MIGRATION_CHALLENGE message). Another possibility: this mechanism can simply consist in communicating the session keys to a network function;

mechanism with the identifier "uni": mechanism for repeating and inverting a particular bit in a packet header, in which a first end device sets the particular bit to 1, 0 respectively, and then a second end device repeats the particular bit to 1, 0 respectively, and then the first end device repeats the particular bit to 1, 0 respectively, and then keeps silent for at least one roundtrip time. It for example carries out a measurement on the one-way flow (when the device is present only in one direction of transmission, as often in the routers on the boundary of an autonomous system or AS. This is for example a variant of the "spin bit" mechanism defined in the QUIC transport protocol specification. In this variant, four phases are distinguished: spin bit set to 1 by the client; then rebound of the spin bit to 1 by the server; then again rebound of the spin bit to 1 by the client; then silence for at least one RTT.

In one particular case mentioned further above, each monitoring mode has a unique mechanism. In this case, the mode and its unique mechanism coincide and the same identifier is used to refer to both cases (for example "rtt" mode and "rtt" mechanism).

Additional Action

In one variant of an implementation, at least one of the monitoring modes includes at least one complementary function implemented by at least one of the two end devices. Examples of complementary functions:

passage (i.e. switching) into a mode ("degraded mode") where one of the two end devices acting as a receiver does not request retransmission of the non-received data;

passage into a mode ("protocol flush mode") where one of the two end devices acting as a transmitter does not transmit application data pending in a transmit buffer and passes to the next data;

passage into a mode ("applications flush mode") where one of the two end devices acting as a sender does not transmit pending application data and passes to the next application data (for example the streaming application passes to the next group of pictures (GoP), a type of fast-forward for technical reasons);

passage into a mode ("network flush mode") where one of the two end devices acting as a sender does not transmit data during a roundtrip time (a type of n ms pause);

sending by one of the end devices acting as a sender of an indication of an increase in allocated network resources;

etc.

Ranking Order

Different types of ranking orders can be used, such as for example:

a "shuffle" type order: random order (for example a set of modes written as "shuffle: [rtt, loss]" is a set where the modes are "rtt" and "loss", and the latter are activated in a random order);

"mano" type order: predetermined and cyclical order with explicit passage from one mode to the next with resumption at the first one (for example a set of modes written as "mano [rtt, loss, qos, pause]" is a set for which the mods are "rtt", "loss", "qos" and "pause", and the latter are activated cyclically in the predetermined order "rtt"/"loss"/"qos"/"pause" at each cycle);

"auto" type order: such as the "mano" type but with implicit passage (periodic or other) from one mode to the next;

"once" type order: like the "mano" type but not cyclical (i.e. with only one cycle) (for example a set of modes written "once: [rttvec, loss]" is a set for which the modes are "rttvec" and "loss", and the latter are activated only once in the predetermined order "rtt"/"loss");

etc.

Examples of Implementation

In one particular implementation, adapted to the case described above of a client proposal, a new TLS extension called CARROUSEL is used. It is similar to the TLS ALPN extension (specified in RFC7301, see https://tools.ietf.org/ html/rfc7301). It supports a filtering (i.e., a modification) by the middleboxes of the network: the server receives the modes supported by the client but in addition they are filtered (i.e. modified) by a network management device when attached to the network (see below description of the step 33 of FIG. 3).

The start of the negotiation process ("handshake") between the client and the server is based on an exchange of "ClientHello" and "ServerHello" messages and can be written as follows:

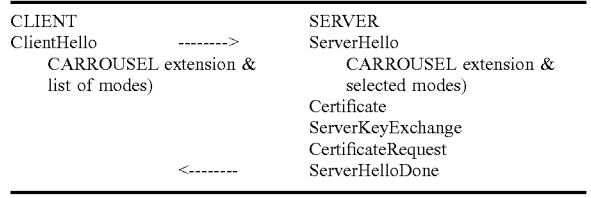

In one particular implementation, the set of modes selected is recorded in a QUIC session ticket (equivalent to the TLS session ticket, see RFC5077) that the server sends to the client when creating the connection and that will be reutilized for the resumption of the sessions (here below, the connection created at the resumption of the session will use the set of modes agreed upon for the creation of the connection). In this case, the exchange of messages can be written as follows:

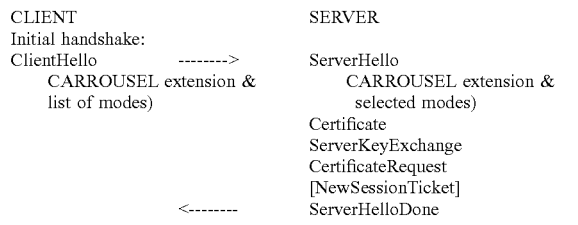

FIG. 3 presents an event diagram illustrating an example of preparation and sharing (discovery) of a set of modes and an associated ranking order when setting up a QUIC connection.

The end device acting as client (here below called a client) is referenced 21. The end device acting as a server (here below called a server) is referenced 23. The middlebox is referenced 22. A device for managing the network (or network management device) is referenced 24. At a step 31, the client makes an attachment with the network management device. In return, he receives a proposal from this device for all the modes and the associated ranking order. In the example illustrated, this is "mano [rtt, loss, qos, goe]". In the light of the definitions given above, this set of modes therefore comprises the four modes "rtt", "loss", "qos" and "qoe", and the ranking order is of the "mano" type.

At a step 32, corresponding to the start of the QUIC handshake process between the client and the server, the client, in a ClientHello CARROUSEL message, sends a modified proposal for the set of modes and the associated ranking order, namely "{mano [rtt, loss, qos, qoe]; once: [rtt, loss]}". In other words, the client has added another set of modes that he knows ("once: [rtt, loss]").

At a step 33, the middlebox modifies the proposal transmitted by the client. More specifically, it replaces the first mode ("rtt") of the first set of modes by the mode "rttvec" (to obtain a more accurate RTT).

At a step 34, the server also modifies the proposal transmitted by the client (and previously modified by the middlebox). More specifically, it deletes a second set of modes ("once: [rttvec, loss]") and modifies the first set of modes (deleting the "qoe", mode to protect privacy).

At a step 35, the server, in a ServerHello CARROUSEL message, transmits the proposal modified at the step 34 for all the modes and the associated ranking order, namely "{mano [rtt, loss, qos]}". Then, the setting up of the QUIC connection is finalized normally.

FIG. 4 presents an event diagram illustrating an example of use of a set of modes and an associated ranking order during the use of a QUIC connection.

The client, the server, the middlebox and the network management device are referenced 21, 23, 22 and 24 respectively as in FIG. 3.

At a step 41 (corresponding to the set of steps of FIG. 3), it is assumed that a connection is set up between the client and the server and that the set of modes and the associated ranking order that are selected are: "{mano [rtt, loss, qos, pause]}".

At a step 42, the server transmits the QUIC packets with the spin bit at 0 (S=0).

At a step 43, the middlebox carries out an enforced inversion of the value of the spin bit so as to activate the set of modes. As discussed further above, the activation of the set of modes corresponds to an activation of the first mode according to the ranking order. In the example illustrated, the "rtt" mode is the first mode of the set of modes "{mano [rtt, loss, qos, pause]}" according to the ranking order. It is therefore this "rtt" mode that is activated.

At a step 44, the middlebox carries out a measurement of RTT (function associated with the "rtt" mode). This is possible because, at a step 44', the client and the server implement the appropriate mechanism (see detailed description of the "rtt" mode further above).

At a step 45', the middlebox performs an enforced inversion of the spin bit value, in order to activate the next mode, according to the ranking order. In the example shown, it is therefore the "loss" mode that is activated.

At a step 46, the middlebox carries out a measurement of packet loss (function associated with the "loss" mode). This is possible because, at a step 46', the client and the server implement the appropriate mechanism (see detailed description further above of the "loss" mode).

At a step 47, the middlebox carries out an enforced inversion of the value of the spin bit so as to activate the next mode according to the ranking order. In the example illustrated, it is therefore the "qos" mode that is activated.

At a step 48, the middlebox carries out a measurement of a QoS (a function associated with the "qos" mode). This is possible because, at a step 48' the client and the server implement the appropriate mechanism (see detailed description further above of the "qos" mode).

At a step 49, the middlebox carries out an enforced inversion of the value of the spin bit so as to activate the next mode according to the ranking order. In the example illustrated, it is therefore the "pause" mode that is activated.

At a step 410, the middlebox is paused. At a step 410', the client and the server are also paused.

At a step 411, the middlebox carries out an enforced inversion of the value of the spin bit so as to activate the next mode according to the ranking order. In the example illustrated, it is therefore the "rtt" mode that is activated (start of a new cycle, i.e. resumption of the first mode of the set of modes).

FIG. 6 presents the structure of a device 60 corresponding to each of the two end devices 21, 23 and the middlebox 22, according to one particular embodiment of the invention used to implement the method of monitoring described further above with reference to FIGS. 3, 4 and 5.

The device 60 comprises a live memory 62 (for example a RAM), a processing unit 61, equipped for example with a processor and driven by a computer program stored in a read-only memory 63 (a ROM or a hard disk drive). At initialization, the code instructions of the computer program are for example loaded into the live memory 62 and then executed by the processor of the processing unit 61.

This FIG. 6 illustrates only one of several possible ways of carrying out the proposed solution. Indeed, the technique of the invention can be done equally well on a reprogrammable computation machine (a computer, a PC, a DSP processor or a microcontroller) executing a program comprising a sequence of instructions or a dedicated computation machine (for example a set of logic gates such as an FPGA or an ASIC, or any other hardware module). Should the invention be embedded in a pre-programmable computation machine, the corresponding program (i.e., the set of sequences of instructions) can be stored in a storage medium that is removable (such as for example a floppy disk, a CD-ROM or a DVD-ROM) or not removable, this storage device being partially or totally readable by a computer or a processor.

Many other embodiments of the invention can be envisaged. Indeed, the particular embodiment described here above with reference to FIGS. 3 to 6 (based on the use of the spin bit to use several monitoring mechanisms, including the spin bit mechanism of the QUIC protocol) can be extended to other contexts wherein a protocol (for example of one of the layers 2 (link layer), 3 (network layer), 4 (transport layer) or 7 (application layer) of the OSI module) provides for the encryption of the control data except for one or more bits readable by the middleboxes to perform at least one monitoring function.

The invention claimed is:

1. A method comprising:
monitoring a connection between end devices via a communications network, wherein a set of modes, comprising at least two monitoring modes, and a ranking order associated with said set of modes, are agreed upon between the end devices and a network device present on a path between the end devices, wherein each monitoring mode of the set comprises at least one mechanism implemented by at least one of the end devices and enabling said network device to perform at least one function of monitoring said connection; and
activating said set of modes, corresponding to:
an activation of a first mode according to said ranking order; then
an activation, according to said ranking order, each other mode of said set of modes:
and wherein, before being agreed upon between the end devices and the network device, said set of modes and said associated ranking order are proposed by a device for managing said network when the end devices are attached to said communications network.

2. The method according to claim 1, wherein at least one of said monitoring modes comprises at least two mechanisms implemented simultaneously by at least one of the end devices, each enabling said network device to perform at least one distinct monitoring function.

3. The method according to claim 1, wherein said at least one monitoring function belongs to the group consisting of:
a measurement of at least one time period;
a measurement of packet loss;
a measurement of quality of service;
a measurement of quality of experience; and
a sending of at least one piece of information to the end devices.

4. The method according to claim 1, wherein said at least one monitoring function belongs to the group consisting of:
a mechanism for repeating and inverting a particular bit in a packet header, in which a first end device sets the particular bit to 1, or 0 respectively, and then a second end device repeats the particular bit to 1, or to 0 respectively, and then the first end device inverts the value of the particular bit;
a combination of a given mechanism belonging to the group and an additional mechanism for inserting a piece of contextual information of applicability of said given mechanism;
a mechanism for repeating or inverting a particular bit in a packet header, in which an end device repetitively sets the particular bit to 1, or 0, respectively;
a mechanism for disabling the encryption of the packet numbering;
should said connection be a multipath connection, a mechanism for adding, in said connection, another path between the end devices that does not encrypt the packet numbering;
should said connection be a multipath connection, a mechanism for adding, in said connection, another path between the end devices, another set of modes and another associated ranking order being agreed upon, for said other path, between the end devices and another network device present on said other path;
a mechanism using at least one bit in a packet header to send at least one piece of information on network context;
a monitoring mechanism at the transport layer;
a monitoring mechanism at the application layer;
a mechanism for repeating and inverting a particular bit in a packet header, wherein a first end device sets the particular bit to 1, or to 0 respectively, and then a second end device repeats the particular bit to 1, or to 0 respectively, and then the first end device repeats the particular bit to 1, or to 0 respectively, and then keeps silent for at least one round-trip time.

5. The method according to claim 1, wherein at least one of said monitoring modes comprises at least one additional function implemented by at least one of the end devices.

6. The method according to claim 5, wherein said at least one additional function belongs to the group consisting of:
passage into a mode where one of the end devices acting as a receiver does not ask for retransmission of non-received data;
passage into a mode where one of the end devices acting as sender does not transmit data pending in a sending buffer and passes to the following data;
passage into to a mode where one of the end devices, acting as a sender, does not transmit pending applications data and passes to following applications data;
passage into to a mode where one of the end devices acting as sender does not transmit data during a roundtrip time; and sending by one of the end devices, acting as a sender, of an indication of an increase in allocated network resources.

7. The method according to claim 1, wherein, after having been proposed, said set of modes and/or said associated ranking order is (are) modified by at least one device among:
the device for managing said network;
at least one of the end devices; and
the network device.

8. The method according to claim 1, wherein said set of modes and said associated ranking order are agreed upon between the end devices and the network device during the connection between the end devices, then recorded in a session ticket, and said set of modes and said associated ranking order that are agreed upon are reusable when a session is resumed or at a new session.

9. The method according to claim 1, wherein the activation of said set of modes is carried out by:
the network device; or
one of the end devices if at least one activation condition is verified.

10. The method according to claim 9, wherein the activation of said set of modes is carried out by the network device and comprises a modification of the value of at least one bit in a packet header, said modification being detectable by one of the end devices.

11. The method according to claim 9, wherein said at least one condition of activation relates to data exchanged and belongs to the group consisting of:
a quantity of data not received by one of the end devices acting as a receiver is above a first predetermined threshold;
a quantity of data retransmitted by one of the end devices acting as a sender is above a second predetermined threshold;
a piece of information on pre-congestion is detected by one of the end devices; and
a quantity of control data detected as being corrupted by one of the end devices is above a third threshold.

12. The method according to claim 1, wherein the activation of each other mode of said set is carried out by the network device or one of the end devices.

13. The method according to claim 12, wherein the passage from one monitoring mode of the set to another monitoring mode of the set by the network device includes a modification of the value of at least one bit in a packet header, said modification being detectable by one of the end devices.

14. The method according to claim 1, wherein said connection is a multipath connection and said path results from an addition of a path into said multipath connection, said addition of a path having been triggered by an activation of another mode that is unique or forms part of another set of modes agreed upon between the end devices and another network device present on another path between the end devices.

15. A non-transitory computer-readable medium comprising program code instructions stored thereon for implementing a method for monitoring a connection between end devices via a communications network, when said instructions are executed by a processor, wherein a set of modes, comprising at least two monitoring modes, and a ranking order associated with said set of modes, are agreed upon between the end devices and a network device present on a path between the end devices, wherein each monitoring mode comprises at least one mechanism implemented by at least one of the end devices and enabling said network device to perform at least one function of monitoring said connection, and wherein the instructions configure the processor to:
activate said set of modes, corresponding to:
an activation of a first mode according to said ranking order; then
an activation, according to said ranking order, each other mode of said set of modes;
and wherein, before being agreed upon between the end devices and the network device, said set of modes and said associated ranking order are proposed by a device for managing said network when the end devices are attached to said communications network.

16. A system comprising:
a reprogrammable computation machine and/or a dedicated computation machine configured to:
monitor a connection between end devices via a communications network, wherein a set of modes, comprising at least two monitoring modes, and a ranking order associated with said set of modes, are agreed upon between the end devices and a network device present on a path between the end devices, wherein each monitoring mode of the set comprises at least one mechanism implemented by at least one of the end devices and enabling said network device to perform at least one function of monitoring said connection; and
activate said set of modes, comprising:
an activation of a first mode according to said ranking order; and
an activation, according to said ranking order, of each other mode of said set of modes,
and wherein, before being agreed upon between the end devices and the network device, said set of modes and said associated ranking order are proposed by a device for managing said network when the end devices are attached to said communications network.

17. The system according to claim 16, wherein the reprogrammable computation machine and/or dedicated computation machine is implemented in said network device or one of the end devices.

* * * * *